3,128,300
3-PHENOXYACRYLONITRILES PREPARED BY CYANOVINYLATION REACTION
Robert E. Miller and Lee A. Miller, Dayton, Ohio, assignors to Monsanto Chemical Company, St. Louis, Mo., a corporation of Delaware
No Drawing. Filed Dec. 9, 1960, Ser. No. 74,774
12 Claims. (Cl. 260—465)

This invention relates to 3-substituted acrylonitriles and more particularly provides a novel method for preparing 3-aryloxy-acrylonitriles prepared by the cyanovinylation of aryl compounds containing a hydroxyl substituent attached to the aromatic nucleus. As a further aspect of the instant invention, new and valuable compounds are prepared by the cyanovinylation of aryl compounds classified as halogenated phenols.

It is an object of the present invention to prepare 3-aryloxy-acrylonitriles by the reaction of halogen-containing compounds, having at least one hydroxyl group attached to an aromatic nucleus, with propiolonitrile.

In preparing the present compounds from propiolonitrile, HC≡CCN, commonly known as cyanoacetylene, a compound containing a phenolic hydroxyl group is contacted with propiolonitrile at room temperature or at a slightly elevated temperature in the presence of an alkaline catalyst at atmospheric pressure or at an elevated pressure until formation of the desired 3-aryloxy-acrylonitrile has occurred. The desired product is formed by the stoichiometric addition of 1 mole of the compound containing the phenolic hydroxyl group to 1 mole of propiolonitrile; accordingly, the present reaction is preferably carried out by contacting equimolar quantities of each of the said reactants. If desired, an excess of the more readily available reaction component can be utilized.

To catalyze our addition reaction, there is used an alkaline catalyst. Since the reaction proceeds at a fairly rapid rate under very mild alkaline conditions, only trace quantities of strongly basic compounds need be used. If desired, weakly basic materials can be used. Examples of such alkaline catalysts are, e.g., the alkali metals such as sodium or potassium; the oxides and hydroxides of alkali and alkaline earth metals such as sodium hydroxide, calcium oxide, magnesium oxide, barium hydroxide; the alkali alcoholates such as sodium methylate or sodium ethylate; the alkali and alkaline earth metal salts of organic acids such as sodium acetate, potassium laurate, etc. Alternatively, in place of an alkaline salt of an alkali metal, etc., an alkaline-reacting organic base such as a tertiary amine or a quaternary ammonium hydroxide compound can be used. For example, we can use trimethyl amine, tripropyl amine, dimethyl cyclohexyl amine, dimethyl aniline, etc. Examples of suitable quaternary ammonium hydroxides are: choline [trimethyl(hydroxyethyl)ammonium hydroxide], Triton B (benzyltrimethylammonium hydroxide), octadecyldiethylmethylammonium hydroxide, etc. In many instances, it is desirable to use an alkaline catalyst for the present reaction which is soluble in organic solvents or in the reaction medium.

If desired, a solvent or diluent can be used in the reaction mixture. Examples of suitable diluents which can be used when desired are liquid organic compounds which are free of active hydrogen, such as benzene, dioxane, hexane, ethylether, dimethylsulfoxide, etc. We prefer to use an inert aromatic or aliphatic hydrocarbon as a diluent.

In order to obtain useful yields of the present reaction products within feasible reaction times, the reaction of propiolonitrile with a halogenated compound containing a phenolic hydroxyl should be carried out at room temperature or at a slightly elevated temperature. The reaction temperatures at which the reaction proceeds at a desirable rate are of the order of from 20° C. up to below the decomposition temperatures of the reactants. Particularly preferably are temperatures of from 20° C. to 100° C. although we can use temperatures as low as −50° C. but at a sacrifice in reaction speed.

While batch operations are described in the following examples, with suitable choice of apparatus, it is possible to operate the present process continuously, and thereby yields up to quantitative can be obtained. Thus, propiolonitrile and a compound containing a phenolic hydroxyl can be injected into a heated tubular reactor wherein a superatmospheric pressure is maintained, the product 3-aryloxy-acrylonitrile being isolated from the resulting reaction product, while unreacted propiolonitrile and said phenolic compound being recycled to undergo further reaction.

According to the instant invention, new and valuable compounds are prepared having the general structural formula

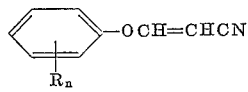

wherein R is a halogen selected from the group consisting of chlorine, bromine, and iodine, and n is an integer of from 1 to 5. Suitable starting materials for the preparation of our novel compounds include the isomeric monochlorophenols, the isomeric monobromophenols and the isomeric monoiodiphenols, 2,3-dichlorophenol, 2,4-dichlorophenol, 2,5-dichlorophenol, 2,6-dichlorophenol, 2,4,5-trichlorophenol, 2,4-dibromophenol, 2,4,5-tribromophenol, 2,4,6-trichlorophenol, 2,4-diiodophenol, pentachlorophenol, pentabromophenol. To prepare our compounds, it is essential that there be at least one halogen substituent attached to the phenolic nucleus.

Within the broad scope of our instant discovery, we have found that we can prepare 3-(halo-substituted aryloxy)-acrylonitriles by the reaction of propiolonitrile with halophenols containing additional substituents attached to the aromatic nucleus, for example, the isomeric monochlorocresols, the isomeric monobromocresols and the isomeric monoiodocresols. Other substituted phenols suitable for use in the preparation of these compounds include 2-chloro-4-tertiary butylphenol, 3-bromo-4-hexylphenol, 2 - iodo-4-dodecylphenol, 3-chloro-4-tetradecylphenol, 2-chloro-3-nitrophenol, 2-bromo-6-nitrophenol, 2,4 - dichloro-6-nitrophenol, 2,4,5-triiodo-3-nitrophenol, etc.

New and valuable compounds can be prepared according to our invention by the reaction of propiolonitrile with any phenolic compound having the general formula

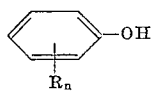

wherein R is a halogen selected from the group consisting of chlorine, bromine, and iodine, and n is an integer from 1 to 5. It will be understood that phenols having other substituents, in addition to at least one halogen substituent attached to the aromatic nucleus, can be used in the practice of this invention, e.g., halonitrophenols, haloalkylphenols, wherein the alkyl groups contain from 1 to 18 carbon atoms, etc.

The present compounds are for the most part solid crystalline materials. They can be used for a variety of chemical and industrial purposes. Since all of our compounds can be considered as derivatives of acrylonitrile, the compounds produced by the practice of our process can be used as monomers to prepare novel polymeric materials suitable for a wide variety of applications such as for fibers, films, moldings and castings. By the practice of our invention it is possible to synthesize monomeric materials which can be converted to polymers having biological toxicant properties. These materials when added to the soil for use as nematocides or for use as systemic plant toxicants have the added feature of having an abnormally slow decomposition rate so that they have a comparatively long effective life. Many of the compounds produced by our process have unusual activity as selected herbicides when used in the monomeric form. For example, the 2,4-dichlorophenoxy acrylonitrile is of particular interest as a herbicide, fungicide, insecticide and nematocide. Furthermore, the compounds of the invention can be used as dielectrics and can be converted by hydrolysis and esterification to materials of potential utility as dielectrics, functional fluids, and plasticizers for various polymeric materials, e.g., polyvinylchloride.

The products of the instant invention can be hydrogenated to prepare nitriles of the general formula 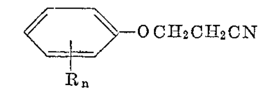 which can be further reduced to prepare amino compounds of the formula 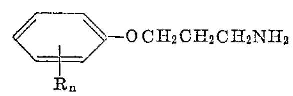 where R is a halogen selected from the group consisting of chlorine, bromine, and iodine, and *n* is an integer from 1 to 5.

In order to illustrate some of the various aspects and advantages of the invention, illustrative examples are given herein. It will, of course, be understood that variations in the particular phenolic compounds, reactant proportions, temperatures, pressures, and the like, can be made without departing from the scope of the invention.

*Example 1*

Propiolonitrile can be derived in high purity and good yield through propiolic acid and alkyl propiolate, propiolic acid amide, and the dehydration of the amide to produce the desired propiolonitrile.

A mixture of 100 g. of ethyl propiolate, obtained by the acid catalyzed esterification of propiolic acid, and 500 ml. liquid ammonia were stirred for 15 hours at −60° C. The amide of propiolic acid was obtained in high purity and essentially quantitative yield by slowly evaporating the excess ammonia at a temperature slightly above the boiling point of liquid ammonia. By-product ethanol and remaining traces of excess ammonia were removed by storing the amide in a desiccator connected to a high vacuum source.

The amide of propiolic acid was dehydrated by heating a mixture of 30.0 g. of the amide with 65.0 g. of phosphorus pentoxide in 150 ml. anhydrous xylene in an atmosphere of dry nitrogen at a temperature of 95–110° C. for 1.75 hours. As the propiolonitrile formed, it was distilled from the reactor and collected in a cold trap. Redistillation of the propiolonitrile yielded 17.5 g. of the desired propiolonitrile in high purity, boiling point 39.5–40.5° C., representing a yield of 78.8%.

The product, propiolonitrile, was determined to be of very high purity in infrared analysis. It was stored in a closed vessel in a refrigeration chest maintained at −50° C., remaining as snow-white crystalline material for an extended time at this temperature.

*Example 2*

To a solution of 13.0 g., 0.08 mole, 2,4-dichlorophenol in 80 ml. dry benzene was added two drops of N-methylmorpholine as a weakly alkaline catalyst. A solution of 4.1 g., 0.08 mole, propiolonitrile in 30 ml. dry benzene was then added dropwise in a 30 minute interval. A slight exothermic effect was noted as the reaction proceeded. The solution was then stirred for 2.5 hours at 33–36° C. and then permitted to stand at room temperature for 72 hours. The benzene was distilled from the reactor at reduced pressure to obtain the solid crude product which was recrystallized from methanol to obtain white needles, melting point 89–90.5° C., weighing 12.3 g., representing a yield of 71.5%. Infrared analysis confirmed the structure of the purified product as 3-(2,4-dichlorophenoxy)acrylonitrile which analyzed as follows:

Calc'd for $C_9H_5Cl_2NO$: C, 50.4; H, 2.33; N, 6.54. Found: C, 50.55; H, 2.29; N, 6.31.

*Example 3*

This example shows testing of the 3-(2,4-dichlorophenoxy)acrylonitrile of Example 2 as a soil fungicide. In this test method, naturally infested soil fortified with fungi which incite root rots, stem cankers, seedling blights and seed decay is treated with a test chemical and incubated in a sealed container for a period of 24 hours. Seeds are sowed in the treated soil which is then incubated at 70° F. for 48 hours before being removed to greenhouse benches. Disease assessments are made two weeks later.

A uniform supply of infested solid containing the *Pythium ultimum* organism was prepared. A 6 ml. aliquot of a 1% stock solution of the product of Example 2 was pipetted into a jar containing 600 g. of infested soil. This initial application rate was 100 p.p.m. or approximately 200 lbs. per 6″ acre. The jar was sealed and the contents thoroughly mixed by vigorous shaking. The treated soil was incubated at 70° F. and 24 hours later was transferred to 4″ pots. Fifteen cotton and cucumber seeds were sowed in each pot. The seed pots were then incubated at 70° F. and at a relatively high humidity (96–98%) to promote activity of the organism in the soil. Forty-eight hours later the pots were removed to the greenhouse.

Two weeks later the number of seedlings emerged and the number remaining healthy were recorded. The percent emergence and disease incidence was based on the inoculated, untreated and sterile soil treatments. The following rating scale was used.

| Rating: | Number of healthy plants |
|---|---|
| Excellent | 26–30 |
| Promising | 19–25 |
| Fair | 11–18 |
| No good | 10 or less |

When 3-(2,4-dichlorophenoxy)acrylonitrile was used in this test, an excellent rating was obtained. Repetition of the testing at a concentration of 30 p.p.m., instead of a 100 p.p.m. concentration also gave promising to excellent results.

When the product of Example 2 was tested for effectiveness as a fungicide at concentrations of 100 p.p.m. and at 30 p.p.m. it gave excellent results against the organism commonly known as apple scab.

While the invention has been described with particular reference to preferred embodiments thereof, it will be appreciated that variations from the details given herein can be effected without departing from the invention in its broadest aspects.

We claim:

1. The process for the preparation of halogenated 3-phenoxyacrylonitriles which comprises the addition of propiolonitrile to a halogenated phenolic compound containing from 1 to 5 halogen atoms in the molecule, said halogen atoms being selected from the group consisting of chlorine, bromine, and iodine, said addition being conducted in the presence of a catalytic quantity of an alkaline material.

2. The process of claim 1 wherein the halogenated phenolic compound is a chlorinated phenol.

3. The process of claim 2 wherein the chlorinated phenol is 2,4-dichlorophenol.

4. The process for the preparation of 3-phenoxy-acrylonitriles of the formula

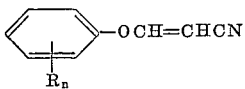

which comprises the addition of propiolonitrile to a nuclear-substituted phenol of the formula

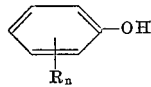

where R is a halogen selected from the group consisting of chlorine, bromine, and iodine and $n$ is an integer from 1 to 5, said addition being conducted in the presence of a catalytic quantity of an alkaline material.

5. The process for the preparation of 3-substituted acrylonitriles of the formula

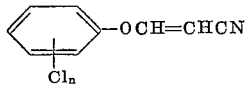

which comprises the addition of propiolonitrile to a chlorophenol of the formula

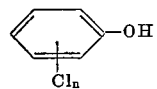

wherein $n$ is an integer from 1 to 5, said addition being conducted in the presence of a catalytic quantity of an alkaline material.

6. The process for the preparation of 3-(dichlorophenoxy)acrylonitriles of the formula

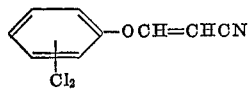

which comprises the reaction of a propiolonitrile with a dichlorophenol in the presence of a catalytic quantity of an alkaline material.

7. 3-phenoxyacrylonitriles of the formula

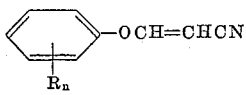

where R is a halogen selected from the group consisting of chlorine, bromine, and iodine and $n$ is an integer from 1 to 5.

8. A compound having a structure defined by the general formula

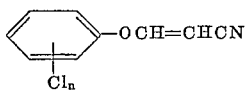

where $n$ is an integer from 1 to 5.

9. A compound having the formula

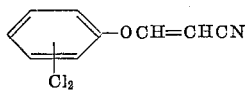

10. 3-(2,4-dichlorophenoxy)acrylonitrile.
11. 3-(2,4,5-trichlorophenoxy)acrylonitrile.
12. 3-(pentachlorophenoxy)acrylonitrile.

References Cited in the file of this patent

UNITED STATES PATENTS

| | | |
|---|---|---|
| 2,421,837 | Hardman | June 10, 1947 |
| 2,609,384 | Russell et al. | Sept. 2, 1952 |
| 2,819,291 | Heininger | Jan. 7, 1958 |

FOREIGN PATENTS

| | | |
|---|---|---|
| 198,252 | Austria | June 25, 1958 |

OTHER REFERENCES

Degering: An Outline of Organic Nitrogen Compounds, 1945, pages 694, 699, 701. Q.D. 251–D4.